United States Patent [19]

Mundlos et al.

[11] 3,928,339

[45] *Dec. 23, 1975

[54] BASIC OXAZINE DYESTUFFS AND PROCESS FOR THEIR PREPARATION

[75] Inventors: Eberhard Mundlos, Heusenstamm; Luis Herz, Offenbach, Main; Rudolf Neeb, Obertshausen; Reinhard Mohr, Offenbach, Main; Johann Ostermeier, Diedenbergen, Taunus, all of Germany

[73] Assignee: Hoechst Aktiengesellschaft, Frankfurt am Main, Germany

[ * ] Notice: The portion of the term of this patent subsequent to Apr. 23, 1991, has been disclaimed.

[22] Filed: Jan. 21, 1974

[21] Appl. No.: 435,277

Related U.S. Application Data

[62] Division of Ser. No. 212,618, Dec. 27, 1971, Pat. No. 3,806,504.

[30] Foreign Application Priority Data

Dec. 31, 1970 Germany............................ 2064735

[52] U.S. Cl.......... 260/244 R; 260/242; 260/246 R; 8/177 R
[51] Int. Cl.²......................................... C09B 19/00
[58] Field of Search ............ 260/244, 243, 242, 246

[56] References Cited
UNITED STATES PATENTS

| | | | |
|---|---|---|---|
| 3,629,248 | 12/1971 | Schafer et al...................... | 260/244 |
| 3,681,347 | 8/1972 | Herz et al........................... | 260/244 |
| 3,806,504 | 4/1974 | Mundlos et al..................... | 260/244 |

FOREIGN PATENTS OR APPLICATIONS

| 41-8311 | 4/1966 | Japan.................................. | 260/244 |
|---|---|---|---|

OTHER PUBLICATIONS

Moores, et al., J. Heterocyclic Chem., Vol. 6, pp. 755–757 (1969).

Primary Examiner—Harry I. Moatz
Attorney, Agent, or Firm—Connolly and Hutz

[57] ABSTRACT

Basic oxazine dyestuffs of the formula I

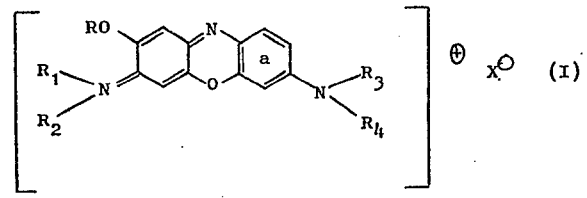

in which R stands for a lower alkyl group which may be substituted, $R_1$ and $R_2$ each stands for a hydrogen atom or a lower alkyl group which may be substituted and which may form together with the nitrogen atom also a heterocyclic radical, $R_3$ stands for a hydrogen atom or a lower alkyl group which may be substituted, $R_4$ stands for a hydrogen atom, a lower alkyl group which may be substituted, an aryl group which may be substituted, or together with the nitrogen atom and $R_3$ or the benzene nucleus $R_4$ may form a heterocyclic radical, and $X_\ominus$ stands for an anion, and the benzene nucleus $a$ may carry further non ionic substituents or a fused benzene nucleus.

The novel dyestuffs are suitable for the dyeing or printing of tannined cellulose fibers, silk, leather or fully synthetic fibers, such as acetate rayon, polyamide fibers or acid-modified polyamide or polyester fibers, especially of fibers containing polyacrylonitrile or polyvinylidene cyanide. The dyeings produced on these fibers are mostly very bright and have a good tinctorial strength as well as, in general, good fastness properties to light and wet processing, for example good fastness to washing, fulling, cross-dyeing, carbonizing, to the action of chlorine and to perspiration.

3 Claims, No Drawings

BASIC OXAZINE DYESTUFFS AND PROCESS FOR THEIR PREPARATION

This application is a division of application Ser. No. 212,618, filed Dec. 27, 1971, now U.S. Pat. No. 3,806,504.

The present invention relates to basic oxazine dyestuffs of the formula I

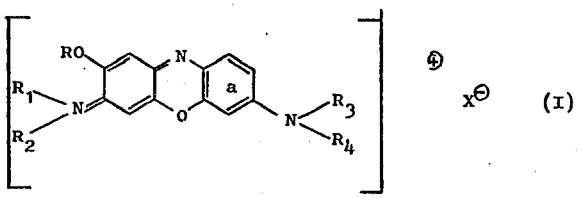

in which R stands for a lower alkyl group which may be substituted, $R_1$ and $R_2$ each stands for a hydrogen atom or a lower alkyl group which may be substituted and which may form together with the nitrogen atom also a heterocyclic radical, $R_3$ stands for a hydrogen atom or a lower alkyl group which may be substituted, $R_4$ stands for a hydrogen atom, a lower alkyl group which may be substituted, an aryl group which may be substituted, or together with the nitrogen atom and $R_3$ or the benzene nucleus, $R_4$ may form a heterocyclic radical, and $X^-$ stands for an anion, and the benzene nucleus $a$ may carry further non ionic substituents or a fused benzene nucleus.

This invention relates furthermore to a process for preparing the dyestuffs, which comprises condensing, in an acid medium, a compound of the general formula II

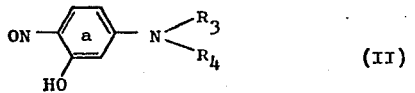

in which $R_3$ and $R_4$ are defined as above, with an aminohydroquinone ether of the general formula III

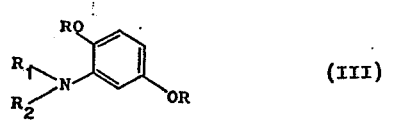

in which R, $R_1$ and $R_2$ are defined as above, or a compound of the formula IV

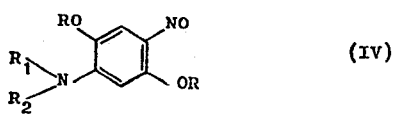

in which R, $R_1$ and $R_2$ are defined as above, with a compound of the formula V

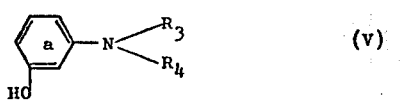

in which $R_3$ and $R_4$ are defined as above.

The dyestuffs may also be obtained by condensing compounds of the formula IV with 2-hydroxy-naphthylenes in an acid medium, optionally in the presence of a condensation agent, for example zinc chloride, and reacting the condensation product with an aliphatic or aromatic primary or secondary amine. The aliphatic or aromatic amine is then suitably used in an excess.

As compounds of the formula II, 4-nitroso-3-hydroxymono- or -dialkyl-anilines are mentioned, in which the alkyl radicals may carry non ionic substituents, such as halogen atom, hydroxy, lower alkoxy, aryloxy, lower acyloxy, cyano, carbamyl, dialkylamino, carbo-lower-alkoxy, lower acylamino, sulfonyl or aryl groups, or which may form together with the nitrogen atom a heterocyclic ring, for example a morpholine or piperidine ring, or together with the benzene nucleus $a$ and the nitrogen atom they may form a heterocyclic radical, for example a hydrogenated quinolinyl radical or a benzomorpholinyl radical. Suitable compounds of the formula II are furthermore 4-nitroso-3-hydroxy-diphenyl-amines which may contain optionally substituted lower alkyl groups linked to the nitrogen atom of the diphenylamine and which may carry, in the benzene nucleus $a$, non ionic substituents, such as halogen atoms, lower alkoxy, aryloxy, lower alkyl, trifluoromethyl, nitro, lower alkylsulfonyl, arylsulfonyl, mono- or di-lower-alkylamino, arylamino, cyano or lower acyl groups.

As compounds of the formula III and IV, resp., there are mentioned amino-hydroquinone dialkyl ethers and 4-nitroso-1-amino-hydroquinone-di-lower-alkyl ethers, in which the amino group may be substituted by one or two lower alkyl groups which again, as the alkyl group for R, may contain further substituents, such as halogen atoms, hydroxy, lower alkoxy or cyano groups or which may form together with the nitrogen atom a heterocyclic ring.

As compounds of the formula V, there are mentioned 3-hydroxy-anilines or 3-hydroxy-diphenylamines, in which the amino group may be substituted by alkyl groups which, together with the nitrogen atom or with the benzene nucleus and the nitrogen atom, may form a heterocyclic radical and which may carry non ionic substituents, such as halogen atoms, hydroxy, alkoxy, aryloxy, acyloxy, cyano, carbamyl, dialkylamino, carbalkoxy, acylamino, sulfonyl or aryl groups. It should be understood that the term "lower" referred to above means from 1 – 4 carbon atoms.

Condensation of the starting compounds concerned is brought about at temperatures of from about 20° to 120°C, preferably from about 50° to 100°C, in an acid medium. Hydrohalides, preferably the hydrochlorides of the p-nitroso compounds, are preferably used and condensation is carried out in the presence of an organic acid, for example formic acid or acetic acid.

The dyestuffs obtainable according to the invention contain, as anion $X^-$, the radical of a strong acid, preferably of sulfuric acid or hydrochloric acid, or a chlorozincate anion. These anions to be introduced according to the invention may also be replaced by anions of other acids, for example of phosphoric acid, acetic acid, oxalic acid, benzene-sulfonic acid, toluene-sulfonic acid, amidosulfonic acid, nitric acid, carbonic acid, lactic acid or tartaric acid.

The novel dyestuffs are suitable for the dyeing or printing of tannined cellulose fibers, silk, leather or fully synthetic fibers, such as acetate rayon, polyamide fibers or acid-modified polyamide or polyester fibers, especially of fibers containing polyacrylonitrile or polyvinylidene cyanide. The dyeings produced on these fibers are mostly very bright and have a good tinctorial strength as well as, in general, good fastness properties to light and wet processing, for example good fastness to washing, fulling, cross-dyeing, carbonizing, to the action of chlorine and to perspiration. They also have good fastness to decatizing, steaming, ironing, rubbing and to the action of solvents. In general, the dyestuffs are, to a great extent, insensitive to a change in the pH-value of the dyebath and, therefore, can be applied both in a weakly acid and a strongly acid bath. They are furthermore stable at temperatures exceeding 100°C as employed in the high-temperature dyeing method.

Dyeing is generally performed in an aqueous medium at boiling temperature or in autoclaves at temperatures exceeding 100°C under pressure. The dyestuffs may, moreover, also be applied from organic solvents.

For preparing aqueous dyebaths and print pastes the dyestuffs may be used in the form of powders which may contain extenders, such as inorganic salts, dextrin and optionally further additives. It is, however, more advantageous to use concentrated aqueous solutions of the dyestuffs, which are easier to handle and which contain about 20 to 60 percent of dyestuff, one or more lower aliphatic carboxylic acids, such as formic acid, acetic acid, propionic acid or lactic acid, as well as, optionally, further additives, such as water-soluble polyhydric alcohols, the ethers or esters thereof, polyethers, aliphatic carboxylic acid amides, lactams, lactones, nitriles, dimethyl-sulfoxide, diacetone alcohol, dioxan, tetrahydrofuran or urea as well as water.

The following Examples serve to illustrate the invention, the parts and percentages being by weight unless stated otherwise.

EXAMPLE 1

10.3 Parts of 2-($\beta$-cyano-ethylamino)-hydroquinone dimethyl ether were dissolved in 100 parts of 70 % acetic acid and 11.3 parts of 4-nitroso-3-hydroxy-N,N-dimethylaniline hydrochloride were added. The mixture was heated to about 50°C and maintained at this temperature for 1 hour. 150 Parts of water and 3 parts of kieselguhr were then added, the mixture was filtered and the dyestuff of the formula

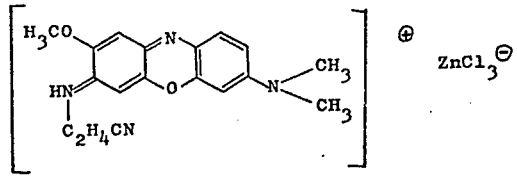

was precipitated from the filtrate by adding 10 parts of 30 % hydrochloric acid and zinc chloride, it was suction-filtered and dried. 21.5 Parts of a dark powder were obtained, which dissolved in water and dilute acids to give a blue solution.

1 g of the dyestuff was mixed while stirring with 2.5 g of 50 % acetic acid and the paste was dissolved in 6 liters of water. Another 1 g of crystallized sodium acetate and 10 g of calcined sodium sulfate were added to the dyebath. Subsequently, 100 g of preliminarily washed yarn made from polyacrylonitrile staple fibers were introduced into the dyebath heated to 60°C, the temperature was slowly raised to 100°C and dyeing was performed within 1 hour at the boiling temperature. The dyed material was then allowed to cool slowly to about 60°C, it was rinsed and dried. A bright greenish blue dyeing having very good fastness properties to light and wet processing was obtained.

EXAMPLE 2

9.3 Parts of 3-hydroxy-diphenylamine were dissolved in 100 parts of 70 % acetic acid and 13.6 parts of 5-nitroso-2-($\beta$-cyano-ethylamino)-hydroquinone dimethyl ether hydrochloride were added. The mixture was heated to about 80°C and maintained at this temperature for 1 hour. The deep blue solution was then added to a mixture of 1,000 parts of water, 5 parts of kieselguhr and 10 parts of 30 % hydrochloric acid, the mixture was filtered and the dyestuff of the formula

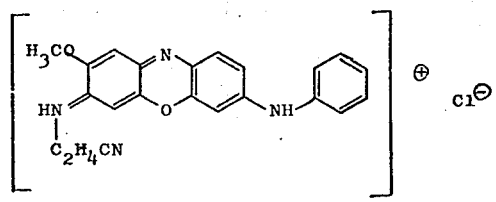

was precipitated from the filtrate by adding sodium chloride, it was suction-filtered and dried. 9.5 Parts of a dark powder were obtained, which dissolved in water and dilute acids to give a blue solution.

1 g of the dyestuff was mixed while stirring with 2 g of 50 % acetic acid and the paste was dissolved in 5 liters of water containing 1 g of crystallized sodium acetate. Subsequently, 100 g of pre-washed material made from acidmodified polyester fibers were introduced into the dyebath at 60°C, the temperature was slowly raised and dyeing was performed within 1 hour at 115° to 120°C. The goods were then cooled to about 70°C, rinsed and dried. A bright greenish blue dyeing having good fastness properties to light and wet processing was obtained.

The following Table comprises further dyestuffs obtainable according to the invention as well as shades of the dyeings produced with these dyestuffs on polyacrylonitrile fibers.

TABLE

| Dyestuff | Shade |
|---|---|
| [CH$_3$O—, H$_2$N=, —O—, —N=, —NH— structure] ⊕ Cl$^\ominus$ | blue |

-Continued

| Dyestuff | | Shade |
|---|---|---|
| [structure: 2-methoxy, 3-NH(C2H4CN), 7-N(C2H5)2 phenoxazine]⊕ | ZnCl3⊖ | greenish blue |
| [structure: 2-methoxy, 3-NH(C2H4CN), 6-CH3, 7-N(CH3)2 phenoxazine]⊕ | ZnCl3⊖ | greenish blue |
| [structure: 2-methoxy, 3-NH(C2H4CN), 7-N(CH3)(C6H5) phenoxazine]⊕ | Cl⊖ | greenish blue |
| [structure: 2-methoxy, 3-NH(C2H4CN), 7-NH(4-CH3-C6H4) phenoxazine]⊕ | Cl⊖ | greenish blue |
| [structure: 2-methoxy, 3-NH(C2H4CN), 7-NH(4-OC2H5-C6H4) phenoxazine]⊕ | Cl⊖ | greenish blue |
| [structure: 2-methoxy, 3-NH(C2H4CN), 7-NH(2,4-dimethyl-C6H3) phenoxazine]⊕ | Cl⊖ | greenish blue |
| [structure: 2-methoxy, 3-N=CH-CH2-CH2-CN (NCCH2CH2NH=), 7-NH(2-CH3-C6H4) phenoxazine]⊕ | Cl⊖ | greenish blue |
| [structure: 2-methoxy, 3-NHCH2CH2CN, 7-NHCH2CH2CN phenoxazine]⊕ | ZnCl3⊖ | greenish blue |
| [structure: 2-OC2H5, 3-NHCH2CH2CN, 7-N(C2H5)2 phenoxazine]⊕ | ZnCl3⊖ | greenish blue |
| [structure: 2-OC2H5, 3-NHCH2CH2CN, 7-N(CH3)2 phenoxazine]⊕ | ZnCl3⊖ | greenish blue |
| [structure: 2-OC2H5, 3-NHCH2CH2CN, 6-CH3, 7-N(CH3)2 phenoxazine]⊕ | ZnCl3⊖ | greenish blue |

| Dyestuff | | Shade |
|---|---|---|
| [structure: ethoxy phenoxazine with NCCH₂CH₂NH= and NH-phenyl] ⊕ Cl⊖ | | greenish blue |
| [structure: ethoxy phenoxazine with H₂N= and NH-phenyl] ⊕ Cl⊖ | | blue |
| [structure: ethoxy phenoxazine with NCCH₂CH₂NH= and NHCH₂CH₂CN] ⊕ ZnCl₃⊖ | | greenish blue |
| [structure: methoxy benzophenoxazine with NCCH₂CH₂NH= and NH-phenyl] ⊕ Cl⊖ | | reddish blue |
| [structure: methoxy phenoxazine with NCCH₂CH₂NH= and NH-C(CH₃)(CH₂)(CH₃)CH₃] ⊕ Cl⊖ | | blue |
| [structure: dimethoxy phenoxazine with NCCH₂CH₂NH= and NH-CH₂CH₂-O-CH₃] ⊕ Cl⊖ | | blue |
| [structure: methoxy benzophenoxazine with NCCH₂CH₂NH= and NH with CH₂CH(OH)CH₂ bridge] ⊕ Cl⊖ | | blue |
| [structure: methoxy phenoxazine with CH₃NH= and NH-phenyl] ⊕ Cl⊖ | | blue |
| [structure: methoxy phenoxazine with C₂H₅NH= and NH-phenyl] ⊕ Cl⊖ | | blue |
| [structure: methoxy phenoxazine with HOCH₂CH₂NH= and NH-phenyl] ⊕ Cl⊖ | | blue |
| [structure: H₃CO, HN-C₂H₄OH phenoxazine with N(C₂H₅)₂] ⊕ ZnCl₃⊖ | | greenish blue |

—Continued

| Dyestuff | Shade |
|---|---|
| [structure with H₃CO, HN-C₂H₄OH, N(CH₃)₂] ⊕ ZnCl₃⊖ | greenish blue |
| [structure with H₃CO, H₂N, N(CH₃)₂] ⊕ ZnCl₃⊖ | greenish blue |
| [structure with H₃CO, HN-C₂H₄CN, NH-C₆H₄-OCH₃] ⊕ Cl⊖ | greenish blue |
| [structure with H₅C₂O, H₂N, N(CH₃)₂] ⊕ Cl⊖ | greenish blue |
| [structure with H₃CO, H₂N, N(C₂H₅)₂] ⊕ ZnCl₃⊖ | greenish blue |

We claim:
1. A basic oxazine dyestuff of the formula

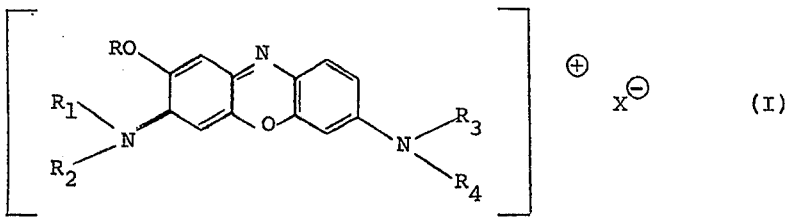

in which R is lower alkyl or lower alkyl substituted by halogen, hydroxy, lower alkoxy or cyano, $R_1$ and $R_2$ each are hydrogen, lower alkyl, or lower alkyl substituted by halogen, hydroxy, lower alkoxy or cyano, $R_3$ is hydrogen, lower alkyl or lower alkyl substituted by halogen, hydroxy, lower alkoxy, cyano, carbamoyl, di-lower alkylamino or carbo-lower alkoxy, $R_4$ is hydrogen, lower alkyl or lower alkyl substituted by halogen, hydroxy, lower alkoxy, cyano, carbamoyl, di-lower alkylamino or carbo-lower alkoxy, or $R_3$ and $R_4$ taken together with nitrogen are a heterocyclic ring selected from the group consisting of morpholino or piperidino, and $X^{(-)}$ is an anion.

2. The basic oxazine dyestuff of claim 1 of the formula

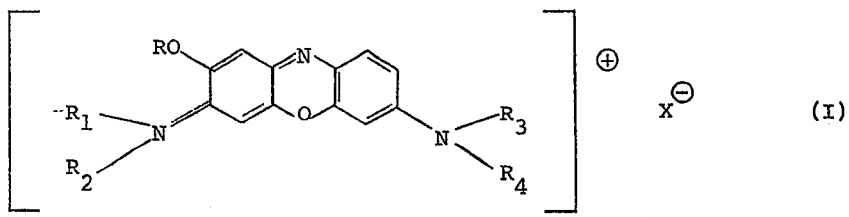

wherein R is lower alkyl, $R_1$ is hydrogen, $R_2$ is hydrogen, lower alkyl or lower alkyl substituted by hydroxy or cyano, $R_3$ is hydrogen or lower alkyl, $R_4$ is lower alkyl or lower alkyl substituted by cyano, and $X^{(-)}$ is an anion.

3. The basic dyestuff of claim 2 wherein $R_1$ is hydrogen and R, $R_2$, $R_3$, $R_4$ and $X^{(-)}$ are defined as in claim 2.

* * * * *